US012251761B2

(12) United States Patent
Peebles et al.

(10) Patent No.: US 12,251,761 B2
(45) Date of Patent: Mar. 18, 2025

(54) APPARATUS AND METHOD FOR BULK STRUCTURAL MODIFICATION OF METALLIC MATERIALS AT REDUCED TEMPERATURES

(71) Applicant: MATSYS INC., Sterling, VA (US)

(72) Inventors: Steven L. Peebles, Berryville, VA (US); Pascal Dube, Chantilly, VA (US); Anthony James Roberts, Chesapeake City, MD (US); Kristopher Allen Darling, Harve de Grace, MD (US)

(73) Assignee: MATSYS INC., Sterling, VA (US)

( * ) Notice: Subject to any disclaimer, the term of this patent is extended or adjusted under 35 U.S.C. 154(b) by 0 days.

(21) Appl. No.: 17/735,317

(22) Filed: May 3, 2022

(65) Prior Publication Data

US 2023/0123703 A1 Apr. 20, 2023

Related U.S. Application Data

(60) Provisional application No. 63/256,005, filed on Oct. 15, 2021.

(51) Int. Cl.
*B22F 9/04* (2006.01)
*B02C 18/14* (2006.01)
(Continued)

(52) U.S. Cl.
CPC ................ *B22F 9/04* (2013.01); *B02C 18/14* (2013.01); *B02C 18/16* (2013.01); *B02C 25/00* (2013.01);
(Continued)

(58) Field of Classification Search
CPC .................. B22F 9/04; B22F 2009/041; B22F 2009/043; B22F 2009/048;
(Continued)

(56) References Cited

U.S. PATENT DOCUMENTS 5,372,845 A * 12/1994 Rangaswamy ........... B22F 9/04 427/242
5,379,952 A * 1/1995 Geiger ................ B02C 17/1815 241/65

FOREIGN PATENT DOCUMENTS

WO WO-2022056260 A2 * 3/2022

OTHER PUBLICATIONS

Kumar et al., "Fabrication of novel cryomill for synthesis of high purity metallic nanoparticles," 2015. Review of Scientific Instruments, vol. 86, No. 083903 (Year: 2015).*

(Continued)

*Primary Examiner* — Ricardo D Morales
(74) *Attorney, Agent, or Firm* — Oblon, McClelland, Maier & Neustadt, L.L.P.

(57) ABSTRACT

An apparatus and method of mechanical milling and grinding of various materials at temperatures ranging from sub-ambient conditions to well-below their ductile-brittle transition temperature (DBTT) are presented. In one embodiment the present invention entails the design of a cryogenic milling chamber compatible with horizontal high-energy mills. The new design and configuration of the milling vessel provides robust and efficient cryomilling of various materials with no contact between the cryogen and the powders. Some embodiments of the invention improve the heat removal rate from the non-uniform heat load generated by the impact energy deposited into the chamber wall by the milling media.

3 Claims, 3 Drawing Sheets

(51) Int. Cl.
*B02C 18/16* (2006.01)
*B02C 25/00* (2006.01)

(52) U.S. Cl.
CPC ..... *B22F 2009/041* (2013.01); *B22F 2203/11* (2013.01)

(58) Field of Classification Search
CPC .......... B22F 2009/049; B22F 2009/042; B22F 2202/03; B22F 2009/045; B02C 17/1815; B02C 17/22; B02C 19/22
See application file for complete search history.

(56) References Cited

OTHER PUBLICATIONS

"Flexible Heating Solution Prevents Frost Caused by Cryogenic Liquids," 2015. Chromalox (Year: 2015).*

Kumar et al, "Green synthesis of Ag nanoparticles in large quantity by cryomilling," 2016. RSC Advances, vol. 6, pp. 111380-111388 (Year: 2016).*

Kumar et al, "Preparation of nanocrystalline high-entropy alloys via cryomilling of cast ingots," 2018. Journal of Material Science, vol. 53, pp. 13411-13423 (Year: 2018).*

Kumar et al, "Cryomilling as Environmentally Friendly Synthesis Route to Prepare Nanomaterials," 2020. International Materials Reviews (Year: 2020).*

Khanna et al, "Review on design and development of cryogenic machining setups for heat resistant alloys and composites," 2021. Journal of Manufacturing Processes, vol. 68, pp. 398-422 (Year: 2021).*

* cited by examiner

PRIOR ART

APPARATUS AND METHOD FOR BULK STRUCTURAL MODIFICATION OF METALLIC MATERIALS AT REDUCED TEMPERATURES

CROSS-REFERENCE TO RELATED APPLICATIONS

This application claims the benefit of priority from U.S. Provisional Application No. 63/256,005 filed Oct. 15, 2021, the entire contents of which are incorporated herein by reference.

BACKGROUND

Field of the Invention

This invention relates to the apparatus and method of mechanical milling and grinding of various materials at temperatures ranging from sub-ambient conditions to well below their ductile-brittle transition temperature (DBTT). In addition to plastic materials, the invention more specifically describes the apparatus for a scalable powder metallurgy-based fabrication method that effectively combines particulate metallic constituents into an alloyed formulation, wherein the level of intermixing of the individual components can be controlled from an intimate (atomic) to a discrete (particulate size) length scale.

Description of the Related Art

Under equilibrium conditions, metallic constituents are typically combined via conventional melting to create new alloy compositions. This method entails heating the constituents in a crucible under controlled atmospheric conditions at elevated temperatures, above their melting point, forming a single-phase liquid. Situations arise when the melting points and densities of the constituents are disparate, leading to incomplete melting, poor mixing, with non-uniform characteristics such as segregation and settling. These forging-based methods are well-demonstrated for traditional materials produced on large industrial scale. However, these methods are non-practical and expensive to use during the development of new materials or for the production of metallic alloys and mixtures on small scale.

Alternative approaches have been developed, such as vacuum or inert gas arc melting, wherein the constituent elements are co-melted using a high-intensity electric arc. An iterative approach has to be taken to control the completeness and adequacy of melting of each of the components without their undue vaporization. Arc-melting methods are thus popular for small scale application, but the transition of such process to larger scales is extremely challenging given the equipment and power requirements.

Mechanical alloying usually takes place in the solid state. Instead of using larger solid pieces as practiced in the former melt-based approaches, the precursors remain in the solid state and are introduced as finely divided powders or particulates. In the preferred embodiments, the precursor powder or powders are placed in a container jar with spherical milling media, e.g., steel shot, zirconia, or tungsten carbide balls with mono- or variable sized diameters. In some cases, process control agents can be added to the mixture to enhance or retard the effectiveness of the mechanical alloying process. The jar is attached to a mechanical device that vibrates or shakes it for an extended period of time. During this process, the powder particles are subjected to frequent interparticle collisions and high-rate impacts. This high energy interaction between the milling balls and the precursor powders, i.e., the ball milling process, causes the comminution, pulverization, blending, and refinement of the precursor powders and the concurrent break down and evolution of their initial internal substructure. In particular, the recurring impacts of the particles to each other and against the walls of the jar caused the particles to deform, adhere, and weld to one another. It is this continuous action of repeated flattening, welding, and fracturing that causes atomic level intermixing or mechanical alloying of the constituents.

Mechanical alloying has been extensively studied and details of the method have been described at great length by Suryanarayana [Ref. 1]. Consequently, there is a broad spectrum of laboratory-scale milling devices for the mechanical alloying of all types of materials. Typically, in most laboratory-scale systems, powder quantities of about 5-10 g can be synthesized. Ranging from vertical (Union Process™, Akron, OH) and horizontal (Zoz GmbH™, Wenden, Germany) mechanical attritor mills to planetary mills (Retsch™ USA, Newtown, PA; and Fritsch Milling™ and Sizing™, Inc., Pittsboro, NC); and shaker mills (SPEX Sample Prep™, Metuchen, NJ), these devices all operate on the same principle as described above. However, of these systems, very few offer any reasonable scalable options for significantly larger-scale milling operations beyond laboratory quantities of high purity milled materials.

For ease, practicality, and convenience, most milling operations are done at ambient temperatures. However, unless milling operations are designed to be interrupted to minimize the heating from impact-induced plastic deformation and friction effects, some form of cooling is necessary to operate the mill continuously. For instance, without active cooling, temperature sensitive materials, e.g., polymers, cannot be ball milled because the polymer will soften and melt or potentially crosslink with the resulting increase of internal temperatures from milling. Similarly, some metals will also soften and essentially cold weld to the media and walls of the milling jar or chamber.

One common way to overcome this deficiency is to add a process control agent (PCA), e.g., solids such as, sodium chloride (NaCl), stearic acid, paraffins, or liquids such as hexane, methanol, etc., to the powder blend. Many types of PCAs exist and they serve in lubricating the particles, milling media, and milling chamber. Nevertheless, unless the product purity is not an issue, the PCA will have to be removed from the processed powder after milling. In some embodiments, such removal of PCA from milled metal powders is required when residual PCA negatively impacts the properties and performance of the final materials. Some of the removal methods are quite involved, requiring high temperature degassing operations that can potentially alter and compromise the as-milled substructure of the powders.

Under some circumstances, it is more suitable to take advantage of the intrinsic properties of materials at sub-ambient temperatures. With decreasing temperatures most materials, including metals, polymers, or biocompatible materials, become increasingly brittle, which eases their breakdown and pulverization during the milling process. More specifically, some materials possess a thermophysical property referred to as the ductile-brittle transition temperature (DBTT). Therefore, a more effective method to facilitate faster break down and alloying of the material feedstock is to perform the milling at sub-ambient or low temperatures, thus eliminating the need for PCA during milling and related post-milling complications that PCAs impose. In most cases, low temperatures between −30° C. and −80° C. are accessible with using common refrigerants, such as freon, carbon dioxide-alcohol mixtures. However, when much lower temperatures are desired, they can be accessed with other alternatives. Temperatures as low as −186° C., i.e., the boiling point of liquid argon; or −196° C., i.e., the boiling point of liquid nitrogen (LN2), or even lower, −269° C., i.e., the boiling point of liquid helium can be attained with commercially available sources. Although there are other cryogenic liquids, such as liquified air, hydrogen, oxygen, or noble gases, they tend to be impractical either due to flammability hazards or because of the costs associated with these options. The range of industries that regularly and routinely use cryo-processing equipment to improve properties includes food products, chemicals, pharmaceuticals, biotechnology, rubbers, and plastics.

Many of the aforementioned commercially available milling systems offer cryogenic cooling options. For example, a laboratory-scale vibratory Retsch™ CryoMill (Newtown, PA) system is available with a cryogenic option wherein the material, sealed in the milling jars, can be pulverized more easily than at room temperature. In this case, the milling jar is continually cooled with flowing liquid nitrogen (LN2) supplied from an external Dewar. However, as indicated, this milling system is primarily intended for organic materials, polymeric, biological, and biomaterials (e.g., tissue, bone, plastics, textiles, paper, wood, etc.). As such, it is designed with a low-frequency agitation system, vibrating at 30 Hz, with the level of imparted energy being low, generated from the impact of a single large diameter ball placed in the jar.

Similarly, the teachings of the FitzMill™ series of hammer, ball, and bead milling systems from Aveka™ (Woodbury, MN) emphasize the friability of materials at LN2 temperatures that enables particle size reductions from coarse pellets to the 100-micrometer and further down to the sub-micrometer size range. The FitzMill™ systems are designed for water-sensitive materials as vaporization of the LN2 can exclude any other species (oxygen, water vapor, etc.) condensing on the surface of the freshly as-milled powder.

A cryogenic pulverization system is available from Pulva™ Corporation, (Saxonburg, PA). The material to be ground is loaded into a feed hopper. From the hopper, the material enters the cooling conveyor where liquid nitrogen is sprayed directly onto the material. This technology can, in some instances, reduce the particle size of materials to as low as 45 microns.

Grinding via the direct injection of LN2 into the chamber with the material processed is also featured in a grinding unit by Air Products (Allentown, PA). Additional cryogenic components, such as a cryogenic conveyor to feed pre-chilled powders in the grinding unit, are also available.

A larger-scale grinding system is found in the Szegvari-type vertical attritor mill from Union Process™ (Akron, OH) which can be fully integrated for cryogenic operations. Herein, the attritor unit consists of a large vessel that contains the powdered material and milling media. A vertically mounted shaft with several radially extending finger-like extensions is spun at high speeds that causes the break down and fracture of the powdered material. The LN2 cryogen is introduced directly into vessel, wherein the powder mass is fully submerged in the liquid during milling. The level of the liquid is maintained by a thermocouple-controlled flow control system.

Most of these cryogenic systems are limited to exploratory small scales and/or operate by exposing the powders to LN2. In such a typical system, the LN2 is placed directly in the milling jar with the powder. Although this operation is suitable for polymers or biomaterials, this operation can lead to contamination when milling metal powders. Accordingly, the exposure of metal powders to LN2 can lead to the incorporation of nitrogen in the powders during the milling operations and the formation of metal-nitride compounds. In some cases, the formation of metal nitrides in bulk powders can imbue benefits, such as reduced grain growth during consolidation. However, the presence of such nitrides is highly detrimental when milled powders of high purity are desired. Metal nitrides of powders involving magnesium, iron, molybdenum, vanadium, chromium, niobium, tantalum, zirconium and hafnium have been reported to mention a few.

Alternatively, some small-scale systems operate by submerging the milling jar in LN2, an operation that has impeded the transition of this milling technology to larger scales.

The confinement of a cryogenic liquid into an independent jacket surrounding the milling jar would offer a way to process powders, especially metal powders, at LN2 temperatures without being in contact with the liquid. Although such a jacket is present in some systems, the jacketed vessels are designed to operate at temperatures well above cryogenic conditions. The primary intent of these water or alcohol-based cooling systems is not to capitalize on the intrinsically different, low temperature metallurgical properties of the material being milled, but essentially to prevent overheating of the milling chamber system, whereby the powders are maintained at a reasonable temperature in the milling chamber for uninterrupted continuous or batch operations.

As such, the standard welded construction of these jacketed milling vessels precludes their use at ultralow- or cryogenic temperature. As materials become brittle at cryogenic temperatures, such welds are susceptible to crack formation during cryogenic milling operations, which can leak the cryogenic liquids into the milling chamber or expose the powders to unintended conditions. Isolating cryogenic liquids, such as LN2, away from the powders imposes other problems onto milling apparatus, such as creating severe temperature gradients between the various components. For example, the extreme temperature gradients impose severe stress on seals, flanges and rotor assemblies, which can result in equipment failure during milling operations.

The horizontal Zoz GmbH™ milling platform is one of the most effective high-energy milling systems given its ability to transfer high-levels of energy to the materials being milled. The horizontally mounted impeller consisting of roughly equally spaced knife-like blades, through a series of couplings and gear shaft is attached to a direct drive motor. The combination of high speeds and impeller design leads to extremely high impact speeds of the media inside the mill. The presence of a vertical withdrawal tube attached to a mounting flange welded on the side of the milling jar allows the loading and removal of the powders from the chamber without detaching the milling chamber. In contrast with other systems, cooling of the milling chamber with common refrigerants occurs in an independent wall of the chamber, avoiding any contact between the coolant and the milled materials. As marketed, the Zoz GmbH™ milling chamber is not suitable for cryogenic operation due to its construction, as outlined above. The design and use of cryogenic chambers compatible with commercial mills are at the center of the invention.

SUMMARY

The present invention comprises a novel design of an apparatus and the associated method for the cryogenic milling under high energy milling conditions that generates highly refined metallic powder blends and alloys thereof.

The invention herein comprises a major improvement to current milling apparatus wherein a cryogenic liquid may be utilized to uniformly cool the outer jacket of a milling jar, thus subjecting powders to the benefits of cryomilling without exposing them to LN2 or other cryogenic liquids. One embodiment of the invention retrofits a new milling vessel design into existing milling systems, and allows cryomilling operations to proceed without leaks or breakage of other components of the mills.

The invention is unique and non-obvious to those skilled in the art of high energy milling as it overcomes several challenges related to the operation of milling systems at cryogenic temperatures. These challenges are interlinked, and they are delineated for clarity in the specification.

Salient features of the invention entail a redesign of the milling chamber of the horizontal attritor milling system manufactured by Zoz GmbH™, wherein a new milling chamber consists of a monolithic body, with a cooling jacket patterned for maximum heat exchange, powder charge, and the rotation of the impeller drive shaft. The fabrication methodology specified herein is applicable to other Zoz Simoloyer® milling chamber models, including the CM01, with a 200 g capacity, the CM08, with an 800-g capacity, the CM20, with a 2000 g capacity, and the CM100, with a 10,000 g capacity, amongst others. The unique ability of the invention to apply at scales ranging from small to large constitutes a major advancement of the field of cryomilling.

The new design of the milling chamber also allows for the ease of manufacturability of the milling system, consisting of the machining of the milling chamber, the geometric patterning of its exterior surface resulting in an efficient heat exchange design, modular construction and assembly of the outer cover, mechanical clamping of the transfer assembly for the removal of the as-milled powders, provisions for temperature monitoring, measurements, and feedback control, along positioning and attachment of the coolant feedthroughs for the passage of the cryogenic liquid within the confined jacket of the milling vessel.

The chamber could be fabricated, but is not limited to, from an austenitic to mostly austenitic stainless steel, typically, Type 304 or Type 316, not subject to, or minimally subject to, having a DBTT as it is cooled from ambient to cryogenic temperatures. Yet further, the use of the correct type of steel, exacerbated by the detrimental effects of thermal cycling will not affect its high impact toughness value. It is noted that Type 316 with a higher molybdenum content could be used if the materials being milled are corrosive. Other variants of austenitic steels may be used, e.g., Type 310, for higher stability at higher temperature operational ranges. Alternative stainless steels, e.g., ferritic, martensitic, or duplex, could be also used, however, their performance will be limited by the onset of thermal fatigue and failure due the onset of their brittleness, if used below their DBTT. One skilled in the art that the chamber material is not limited to steel types, but is open to other materials as different properties are required.

Further, the design allows for the circulation of any cryogenic liquid, chlorofluorocarbons (CFCs), hydro-chlorofluorocarbons (HCFCs), or hydro-fluorocarbons (HFCs), or other common refrigerants. Such refrigerants include inorganic and organic compounds, such as methyl or ethyl alcohol, ethylene glycol, propylene glycol, carbon dioxide, ammonia, helium, other noble gases, but not limited to liquid nitrogen or liquid argon. Refrigerants based on aqueous dilutions of these compounds or others are also compatible with the invention. In the preferred embodiment, the preferred cryogen is not flammable, non-toxic, not ozone depleting, and is cost effective.

In one embodiment, the new design features ports which allow for the incorporation of thermocouples on the milling chamber. Temperature data of the cryogenic liquid can be collected at various point of the vessel, including the inlet, the outlet, back flange along with other locations on the jacket. In one embodiment, the direct monitoring of the temperature profiles allows for the automated regulation of flow rate of the cryogenic fluid within the chamber walls in order to maintain a desired temperature setpoint.

In one embodiment, the design allows for improved thermal control and thermal management of the drive shaft housing. This does not only thermally insulate the rotating parts, but also improves the performance of seals, prevents the leakage of milled powder particulates that would otherwise abrade and compromise the effectiveness of milling operations. Those skilled in the art will recognize that the integration of such thermal regulation features can be performed directly on commercial vessels in order to improve their overall milling efficiency.

In one embodiment, the present invention entails a novel method for the processing of metallic powdered materials under their DBTT to result in higher efficiencies of powder particle size refinement and concurrent intermixing between the constituent species.

In another embodiment, the present invention offers novel method to promote limited or differential co-alloying to complete and full alloying of the constituent powders rapidly and efficiently via the high energy milling conditions at a range of sub-ambient to cryogenic temperatures that can be adjusted, depending on the milling conditions and the type of cryogen being used.

In yet another embodiment, the present invention provides the means for scaling the milling process, wherein the attachment of the milling chamber to the direct drive motor shaft and heat extraction methodology can be directly scaled to the next larger size milling system.

DETAILED DESCRIPTION

The present invention described herein entails the design of a cryogenic milling chamber compatible with the Zoz GmbH™ mills. The intent of this modification is to enable cryomilling operations with this series of equipment, where the new design and configuration of the milling vessel provides robust and efficient cryomilling of various materials with no contact between the cryogen and the powders. As secondary benefit, some embodiments of the invention improve the heat removal rate from the non-uniform heat load generated by the impact energy deposited into the chamber wall by the milling media.

The unique aspect of this novel design addresses the mechanical loads and stresses induced by the thermal gradients within the milling chamber and between the milling chamber and the motor housing mounting plate. This allows the milling chamber to operate at cryogenic temperatures with mechanical integrity over multiple repeated runs. A second aspect of the invention relates to the ability to design the flow of the cryogenic fluid in the chamber jacket to establish uniform temperature conditions in the entire chamber wall quickly and efficiently. In turn, the uniformity of the temperature leads to the elimination of cold and hot spots, resulting in constant and unvarying conditions and thus the consistent treatment of the powders undergoing the milling process.

Figure 1:
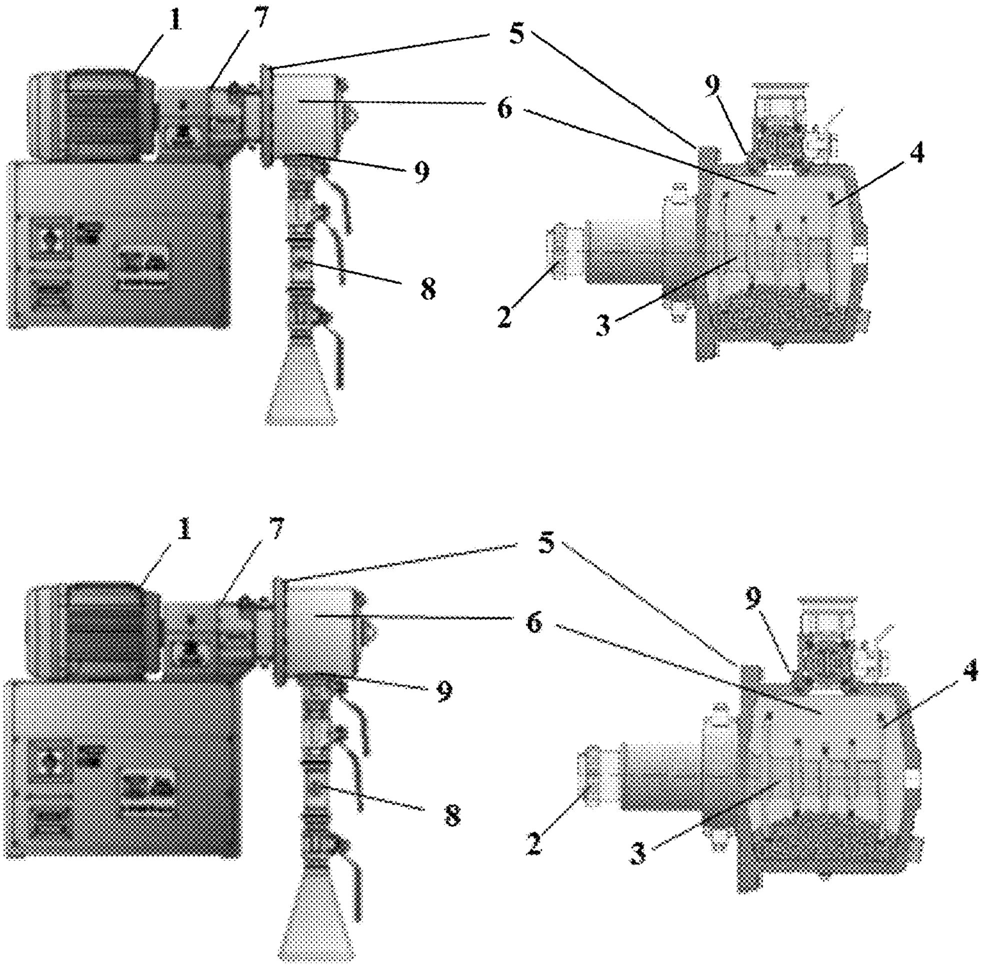
PRIOR ART Figure 1
FIG. 1 presents the schematic drawing of the Zoz GmbH™ horizontal attritor milling system.

A schematic diagram of the Zoz Simoloyer® milling apparatus is shown in FIG. 1. As depicted, the direct drive motor (1), through a series of couplings and gear shaft (2) is attached to the horizontal impeller (3) consisting of roughly equally spaced knife-like blades (4). The base flange (5) of the hat-shaped milling jar (6) is bolted to the back of the drive shaft and motor mount (7) that holds the drive shaft assembly and gear couplings. There is a withdrawal tube (8) attached to a square-shaped flange (9) located on the top of the milling jar; the chamber can be rotated to invert the tube and remove the as-milled powders from the chamber.

Figure 2:
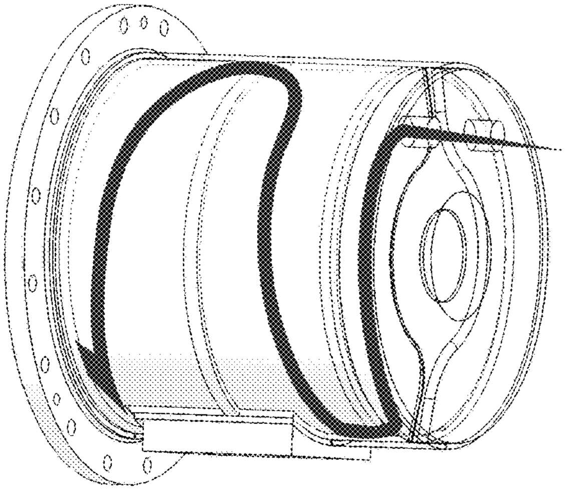
FIG. 2 presents a schematic drawing of the milling chamber and cooling jacket featuring a wide flow path where the cryogen travels through the entire jacket before exiting.

As shown in FIG. 2, the present construction of the Zoz™ milling jar is such that it comes with an integral outer jacket that enables the circulation of the refrigerant (e.g., water or ethylene glycol-based liquids). If not cooled, during milling the chamber reaches temperatures that are detrimental to the effective processing of the materials. Thus, the refrigerant provides active cooling that facilitates the extraction of heat from the powder mass and milling media that allows for extended and uninterrupted operations.

There are several challenges or considerations in the current Zoz™ apparatus that the invention addresses. These are related to the thermal and mechanical loads and stresses created by the extreme cold operating temperatures.

A first challenge is related to the construction of the stainless-steel milling jar that consists of welded sections that have been machined to create a smooth interior wall surface. In particular, both the base flange 5 and the powder removal pipe flange 9 have been attached to the cylindrical vessel and welded into place. As such, repeated operation with a cryogenic coolant will likely cause the weld seams to embrittle, fail, and crack, and hence allow the entry of the cryogen into the milling chamber. Similarly, if there are any incomplete welds, such gaps, cracks, and bull defects will also expand and leak cryogen once cooled to low temperatures.

A second challenge is related to the temperature differential that exists under extreme operational conditions. Unlike under normal operating conditions and temperatures, extreme cooling results in significant and differential shrinkage leading to thermal gradients induced internal stresses that will cause warping and incomplete sealing between the chamber flange and motor housing base plate, again leading to possible leakage of the cryogen into the milling volume.

Another challenge is related to the powdered material undergoing milling. Ultra-fine and nano-scale particulates can flow through any of the aforementioned open cracks, warped seals, and fittings into the environment, cooling jacket, or accumulate in the gear shaft housing and other places within the milling assembly.

A fourth challenge is related to the limitations of the chamber design itself. The cooling jacket in the present milling chamber has a fixed flow pattern and thus it has a fixed cooling efficiency that is optimized for a water-based coolant. The temperature and specific heat of the coolant is such that for the available flow rates it can remove the heat at sufficiently high rates to ensure continuous milling operations.

Optimization of the flow pattern and cooling jacket volume area can eliminate the presence of hot and cold spots that otherwise would lead to non-uniform chamber wall temperatures. Further, more uniform wall temperatures will reduce adhesion or cold welding of the milled powders to the chamber wall, and thus extend the effectiveness of the mechanical alloying process, and increase the quality and quantity of powder production and powder recovery.

Figure 3:
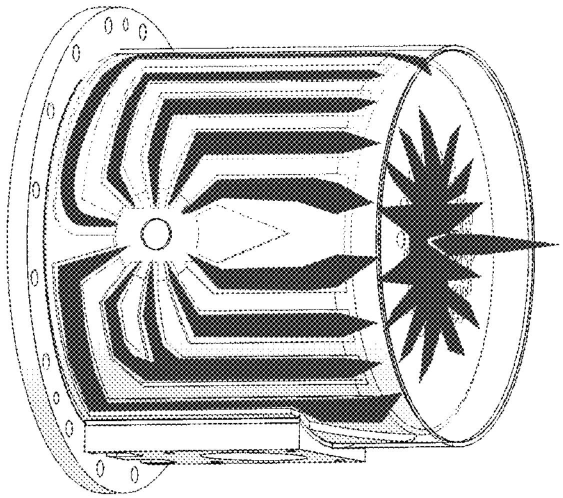
FIG. 3 presents an exemplary flow pattern for the cryogenic fluid flow with divergent channels guiding the cryogen from the lateral entry points to the exit port on the face plate side.
Figure 4:
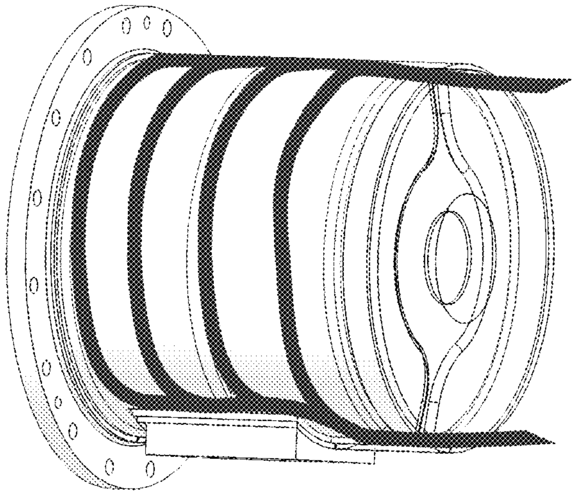
FIG. 4 presents an alternative flow pattern for cryogenic fluid flow featuring parallel radial channels.
Figure 5:
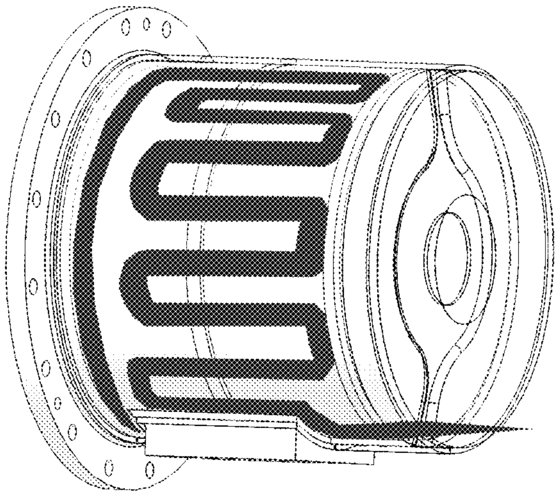
FIG. 5 presents a flow pattern for the cryogen featuring a single flow path with multiple redirections to provide turbulent mixing.

The invention described herein overcomes problems of the prior art by providing a more efficient and reliable method for controlling both the temperature at the chamber wall as well as the internal temperature inside the chamber. In one of the embodiments, the flow of the refrigerant is altered to facilitate a uniform and rapid spread and covering the entire surface of the chamber, instead of the stepwise laminar flow from sector to sector as was done in the prior art. The schematic diagram of exemplary flow channel patterns is illustrated in FIG. 3. It will be obvious to those skilled in the art that the inner division of the jacket into sections by axial or longitudinal ribs and patterns will be instrumental in ensuring optimal heat removal ability by the cryogen. In one embodiment of the invention, there are a series of orifices in the jacket at the base of the chamber that allows for the passage of the refrigerant through the back flange and the motor housing plate to provide cooling to the gear shaft and couplings.

Another aspect of the preferred embodiment is its unibody construction. This non-obvious aspect of the invention relates to the inner chamber being constructed and machined out of a single block of stainless steel or related metal. This is unlike that of the prior art designs, where the chambers consist of a multitude of individual parts and components welded together, including a uniform diameter cylinder, with a square hole cut into it for the placement and insertion of a flange base that would permit the attachment of the powder withdrawal tube. In one embodiment of the invention, the integration of the flange base as an integral part of the chamber will minimize thermal fatigue and cryogen leak, in opposition to standard chamber designs.

In one embodiment, the inner chamber is made of Type 316 steel. In another embodiment, Type 310 steel is used. Those skilled in the art will recognize that other types of steel can be used.

One embodiment of the invention features strategically placed heating units embedded in the cryogenic milling chamber. The function of heating units allows for minimizing the thermal gradients between connecting components of the milling assembly, such as withdrawal tube 8 and back flange connection to the motor mount 7. In one embodiment, controlled heating of these components and others minimizes thermal shrinkage of metal parts, gaskets and seals and thus minimize leaking potential of cryogen, powder and/or contamination with air. In another embodiment, thermal modules can ensure the proper function of mechanical components by enabling their function even at cryogenic temperature.

The milling of powders under cryogenic conditions can significantly benefit from controlled milling parameters, including temperature. As such, the introduction of thermocouples within the milling chamber walls to monitor temperature points of the assembly. In a preferred embodiment, thermocouples are incorporated at multiple points of the chamber walls to monitor the temperature of the cryogenic fluid. In another embodiment, the emplacement of thermocouples at the inner wall of the milling chamber allows for the measurement of temperature in close proximity to the powder being milled.

Temperature regulation during cryomilling operations can be performed by manually adjusting the flow of cryogen within the milling chamber jacket. Alternatively, a preferred embodiment of the invention features the automated flow of cryogen controlled in real time by selected thermocouple input.

These features of the invention provide a significant advantage and enable the cryomilling of materials where the powder and cryogenic fluid are not in contact. Those skilled in the art of milling will understand that the design and added controls enable cryomilling operations to be transitioned to other vessel sizes and geometries.

REFERENCES

1. C. Suryanarayana, "Mechanical alloying and milling," Progress in Materials Science, 46, 1-2, pp. 1-184, 2001.

The invention claimed is:

1. A monolithic milling vessel with improved cooling capacity, comprising:

an inner chamber having no welded sections that could permit egress of a refrigerant or coolant into the interior of the vessel; and an exterior surface having a geometric surface pattern, which includes axial ribs and a series of orifices, specifically designed for heat exchange between the refrigerant or coolant and the milling vessel, wherein the ribs are disposed in a divergent channels or parallel radial channels guiding the refrigerant or coolant from at least one entry point to an exit port, and the series of orifices are provided at a base of the inner chamber and are configured to allow for the passage of the refrigerant or coolant through a back flange and a motor housing plate to provide cooling to a gear shaft and couplings.

2. The monolithic milling vessel of claim 1, wherein heating modules are strategically placed as part of the milling chamber to control temperature gradients, ensuring proper function of mechanical components and seals.

3. The monolithic milling vessel of claim 1, wherein the refrigerant or coolant flow is controlled by readings of thermocouples.

* * * * *